(12) United States Patent
Adoc, Jr. et al.

(10) Patent No.: US 10,474,693 B2
(45) Date of Patent: Nov. 12, 2019

(54) RESOLVING CONFLICTS WITHIN SAVED STATE DATA

(71) Applicant: Amazon Technologies, Inc., Seattle, WA (US)

(72) Inventors: Mario Vargas Adoc, Jr., San Francisco, CA (US); Jeremy Stephen Hynoski, Seattle, WA (US); Richard David Krog, Seattle, WA (US); Christopher Lawrence Lavin, Seattle, WA (US); Anthony Warren Sajec, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 15/383,436

(22) Filed: Dec. 19, 2016

(65) Prior Publication Data

US 2017/0097974 A1    Apr. 6, 2017

Related U.S. Application Data

(60) Continuation of application No. 14/853,143, filed on Sep. 14, 2015, now Pat. No. 9,536,261, which is a division of application No. 13/850,119, filed on Mar. 25, 2013, now Pat. No. 9,141,682.

(51) Int. Cl.
| | |
|---|---|
| *G06F 17/00* | (2019.01) |
| *G06F 16/27* | (2019.01) |
| *G06F 16/23* | (2019.01) |
| *G06Q 30/06* | (2012.01) |
| *G06F 9/52* | (2006.01) |

(52) U.S. Cl.
CPC .............. *G06F 16/27* (2019.01); *G06F 9/52* (2013.01); *G06F 16/2365* (2019.01); *G06Q 30/0641* (2013.01)

(58) Field of Classification Search
CPC ........ G06F 16/27; G06F 16/2365; G06F 9/52; G06Q 30/0641
USPC .................................................. 707/600–899
See application file for complete search history.

(56) References Cited

U.S. PATENT DOCUMENTS

| | | | |
|---|---|---|---|
| 8,734,255 | B2 | 5/2014 | Van Os et al. |
| 8,839,336 | B2 | 9/2014 | Perlman et al. |
| 9,130,820 | B2 | 9/2015 | Lampell et al. |
| 9,244,993 | B1 | 1/2016 | Adoc, Jr. et al. |
| 9,244,994 | B1 | 1/2016 | Adoc, Jr. et al. |
| 9,411,872 | B1 | 8/2016 | Adoc, Jr. et al. |
| 9,589,042 | B1 | 3/2017 | Adoc et al. |

(Continued)

OTHER PUBLICATIONS

U.S. Appl. No. 15/420,746, filed Jan. 31, 2017, Response to Non-Final Office Action dated Dec. 8, 2017.

(Continued)

*Primary Examiner* — Isaac M Woo
(74) *Attorney, Agent, or Firm* — Thomas | Horstemeyer, LLP

(57) ABSTRACT

Disclosed are various embodiments for synchronizing application state information across devices. More specifically, embodiments of the disclosure are related to resolving conflicts between application state information. A synchronization rule, an event name and/or event value are embedded within application state information obtained from devices associated with a user, from which conflicts can be resolved by an application synchronization service.

20 Claims, 10 Drawing Sheets

(56) References Cited

U.S. PATENT DOCUMENTS

| | | | |
|---|---|---|---|
| 9,654,551 | B2 | 5/2017 | Vyrros et al. |
| 2006/0101054 | A1 | 5/2006 | Dempski et al. |
| 2007/0283049 | A1* | 12/2007 | Rakowski ............ G06F 9/44505 709/246 |
| 2010/0279774 | A1 | 11/2010 | Braig et al. |
| 2011/0086712 | A1 | 4/2011 | Cargill |
| 2011/0119233 | A1 | 5/2011 | Reddy |
| 2014/0187315 | A1 | 7/2014 | Perry |

OTHER PUBLICATIONS

U.S. Appl. No. 15/420,746, filed Jan. 31, 2017, Non-Final Office Action dated Dec. 8, 2017.

U.S. Appl. No. 15/215,943, filed Jul. 21, 2016, Notice of Allowance dated Apr. 20, 2017.

U.S. Appl. No. 15/215,943, filed Jul. 21, 2016, Response to Non-Final Office Action dated Jan. 12, 2017.

U.S. Appl. No. 13/850,119, filed Mar. 25, 2013, Response to Non-Final Office Action dated Feb. 5, 2015.

U.S. Appl. No. 13/850,119, filed Mar. 25, 2013, Non-Final Office Action dated Feb. 5, 2015.

U.S. Appl. No. 13/850,119, filed Mar. 25, 2013, Response to Restriction/Election dated Nov. 25, 2014.

U.S. Appl. No. 13/850,119, filed Mar. 25, 2013, Restriction/Election dated Nov. 25, 2014.

U.S. Appl. No. 14/853,143, filed Sep. 14, 2015, Response to Non-Final Office Action dated May 10, 2016.

U.S. Appl. No. 14/853,143, filed Sep. 14, 2015, Non-Final Office Action dated May 10, 2016.

U.S. Appl. No. 13/921,735, filed Jun. 19, 2013, Notice of Allowance dated Sep. 29, 2015.

U.S. Appl. No. 15/005,317, filed Jan. 25, 2016, Response to Non-Final Office Action dated Jun. 30, 2016.

U.S. Appl. No. 15/005,317, filed Jan. 25, 2016, Non-Final Office Action dated Jun. 30, 2016.

U.S. Appl. No. 13/921,503, filed Jun. 19, 2013, Notice of Allowance dated Sep. 15, 2016.

U.S. Appl. No. 15/000,396, filed Jan. 19, 2016, Notice of Allowance dated Apr. 6, 2016.

U.S. Appl. No. 15/000,396, filed Jan. 19, 2016, Response to Non-Final Office Action dated Feb. 25, 2016.

U.S. Appl. No. 15/000,396, filed Jan. 19, 2016, Non-Final Office Action dated Feb. 25, 2016.

U.S. Appl. No. 15/215,943, filed Jul. 21, 2016, Non-Final Office Action dated Jan. 12, 2017.

U.S. Appl. No. 15/420,746, filed Jan. 31, 2017, Notice of Allowance dated Jul. 3, 2018.

\* cited by examiner

```
Application State Information 241c
   ┌──301──┐ ┌──303──┐
"LatestStringList:levelsPlayed": {      351
    "maxSize": 3,
    "values": [
        {                          305
            "value": "3",
            "timestamp": 1363001400
        },                          307
        {
            "value": "2",
            "timestamp": 1363001200
        },
        {
            "value": "1",
            "timestamp": 1363001000
        }
    ]
}
```

FIG. 4A

```
Application State Information 241d

"LatestStringList:levelsPlayed": {
    "maxSize": 3,
    "values": [
        {
            "value": "6",
            "timestamp": 1363001500
        },
        {
            "value": "5",
            "timestamp": 1363001300
        },
        {
            "value": "4",
            "timestamp": 1363001100
        }
    ]
}
```

FIG. 4B

```
Resolved Conflict 353

"LatestStringList:levelsPlayed": {
    "maxSize": 3,
    "values": [
        {
            "value": "6",
            "timestamp": 1363001500
        },
        {
            "value": "3",
            "timestamp": 1363001400
        },
        {
            "value": "5",
            "timestamp": 1363001300
        }
    ]
}
```

FIG. 4C

RESOLVING CONFLICTS WITHIN SAVED STATE DATA

CROSS-REFERENCE TO RELATED APPLICATIONS

This application is a continuation of and claims the benefit of U.S. patent application Ser. No. 14/853,143, filed Sep. 14, 2015, entitled "RESOLVING CONFLICTS WITHIN SAVED STATE DATA," as well as U.S. patent application Ser. No. 13/850,119, filed Mar. 25, 2013, now U.S. Pat. No. 9,141,682, entitled "RESOLVING CONFLICTS WITHIN SAVED STATE DATA," both of which are incorporated herein by reference in their entireties.

BACKGROUND

Applications that are distributed via an application marketplace are often installed on multiple devices by a user. A developer of an application may wish to synchronize state information across the multiple installations across various devices of a particular application. Accordingly, developers can employ one or more software libraries for the purpose of generating state information of an application as the application executes, which can be synchronized across the various installations of the application. The state information generated by various devices associated with the user may create synchronization conflicts.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 4A-4C is a representation of application state information generated by applications and a resolved conflict according to various embodiments of the present disclosure.

DETAILED DESCRIPTION

The present disclosure relates to synchronizing data associated with the state of an application between multiple devices that may be associated with a user. Applications that are distributed via an application marketplace are often installed on multiple devices associated with a user account. For example, a user may own a tablet device as well as a smartphone and install an application distributed by the application marketplace on both devices. Accordingly, embodiments of the disclosure can facilitate synchronization of data relating to the application across the various devices associated with the user by employing an application synchronization service to which applications report application state information, which can in turn facilitate synchronization of application state information across multiple devices.

Wherein an application is a game application, application state information can comprise, for example, information that is related to game applications, such as scoring data, game progress, game achievements, game timing information, time stamps, and any other information relating to execution of a game. Application state information can also related to media such as books, movies, music, etc., that is rendered or consumed via a media player application. In this scenario, the application state information can relate to a page number and/or time code within media that a user last viewed and/or consumed. In some scenarios, conflicts can arise between application state information that is reported by devices. For example, execution of one application instance in a user's tablet device may report application state information that indicates that the user's high score of the day was 1,000. However, execution of another application instance in the user's smartphone may indicate that the user's high score of the day was 1,100. Therefore, embodiments of the present disclosure provide for conflict resolution when conflicts arise within application state information that is saved in a data store.

Figure 1A:
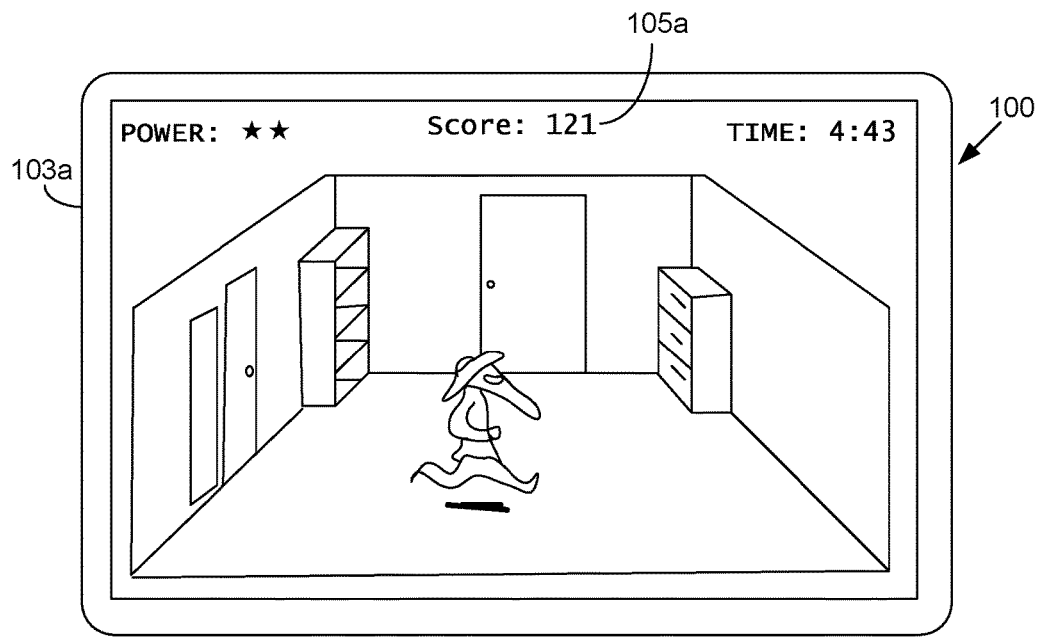
FIGS. 1A-1B are drawings of example application executed by client applications according to various embodiments of the present disclosure.
Figure 1B:
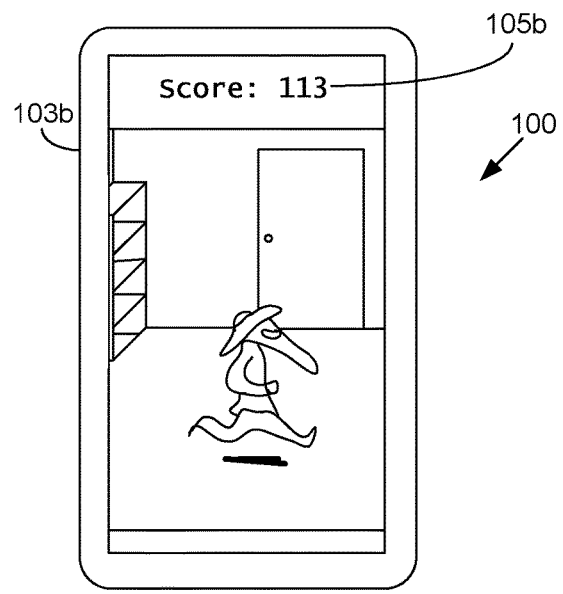

With reference to FIGS. 1A-1B, shown is an example scenario in which an application executed by a client device 103a and 103b. In the scenario 100 shown in FIGS. 1A-1B, the application can be distributed by an application marketplace. In the example of FIGS. 1A-1B, the client devices 103a and 103b are associated with a particular user account. In other words, the user has installed the same application on multiple devices. An application synchronization service can be associated with the application marketplace and/or independent from an application marketplace and facilitates synchronization of game state data.

As shown in the example of FIG. 1A, an application instance corresponding to execution of a particular application is executed by the client device 103a can incorporate functionality in which a user may utilize an account held with a third party service for the purpose tracking achievements, game progress, game scores, or any other data related to the state of an application that can be saved. Accordingly, an application can be bundled with a software library and/or code fragments related to an application marketplace and/or application synchronization service that facilitate the creation of application state information in a data structure that can be transmitted to a synchronization service. As shown in the client device 103b that is also associated with the user, another application instance corresponding to execution of the application may be executed on another device associated with the user.

Accordingly, each application instance may report, for example, scoring information corresponding to a score 105a or 105b of the user. Such a score can, for example, comprise a running score that represents a number of points assigned to the user across all instances of execution of the application. Accordingly, as shown in the scenario of FIGS. 1A and 1B a conflict may arise between scoring information that is reported by each application instance. Embodiments of the disclosure can facilitate resolution of such a conflict by a synchronization service utilized by a developer without further action required on the part of the developer and/or either application instance. In the following discussion, a general description of the system and its components is provided, followed by a discussion of the operation of the same.

Figure 2:
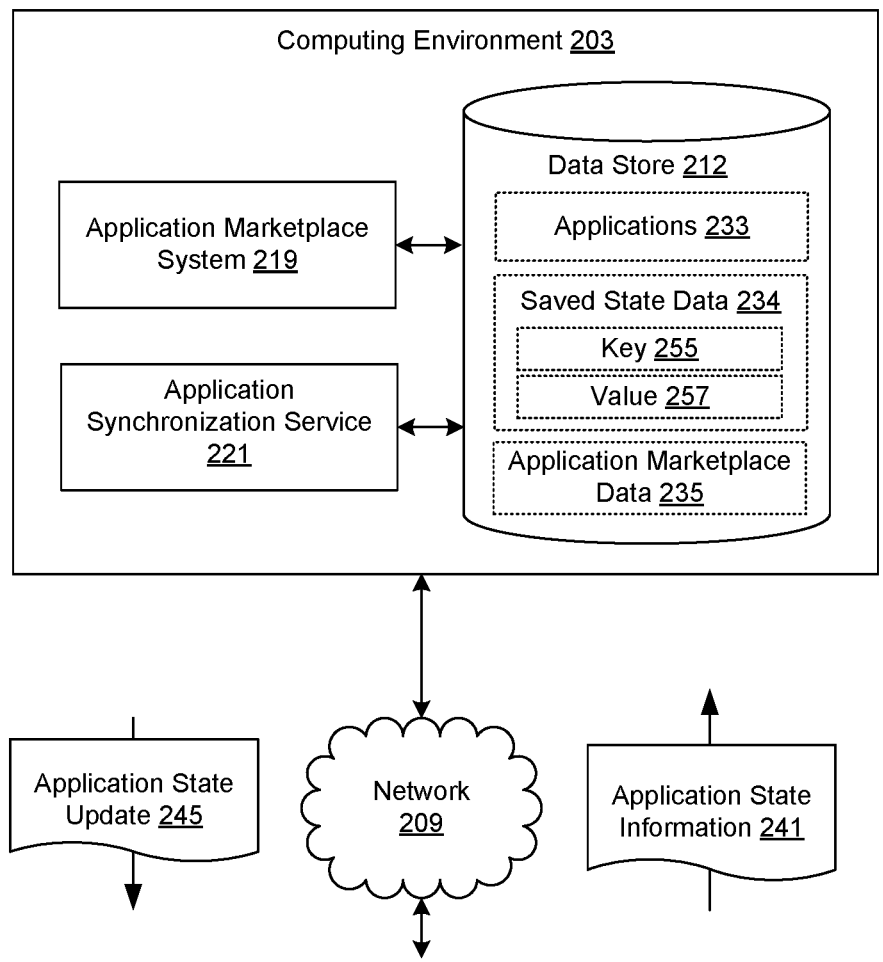
FIG. 2 is a drawing of a networked environment according to various embodiments of the present disclosure.
Figure 2:
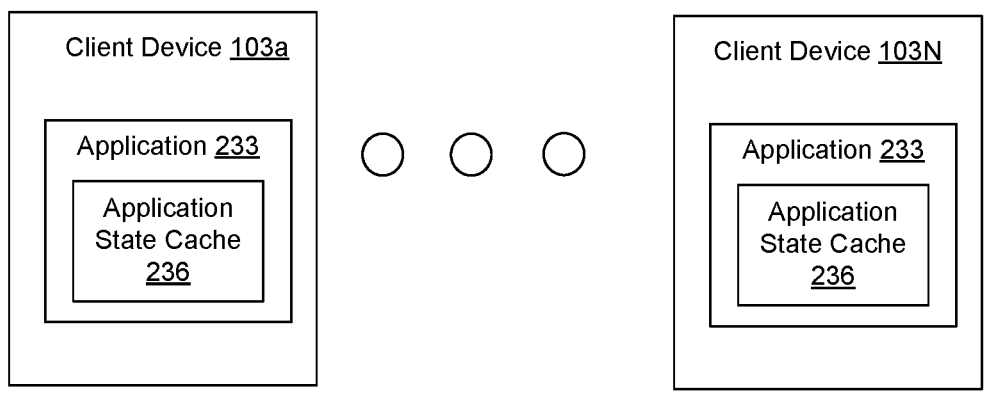

Turning now to FIG. 2, shown is a networked environment 200 according to various embodiments. The networked environment 200 includes a computing environment 203 and one or more clients 103 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an application marketplace system 219, application synchronization service 221 and other applications, services, processes, systems, engines, or functionality not discussed in detail herein. The application marketplace system 219 may communicate with the client device 103 using various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 209.

The application marketplace system 219 is executed to provide functionality relating to an application marketplace in which a multitude of applications 233 may be submitted by developers and made available for purchase and/or download by users. The application marketplace system 219 may include functionality relating to electronic commerce, e.g., shopping cart, ordering, and payment systems. The application marketplace system 219 may support searching and categorization functionality so that users may easily locate applications 233 that are of interest. The application marketplace system 219 may include functionality relating to verification of compatibility of applications 233 with various clients 103.

The application synchronization service 221 is executed to synchronize application state information 241 associated with instances of applications 233 executed by various client devices 103 that are associated with a user account. Application state information 241 can include information relating to application usage that is associated with an application instance executed by a client device 103. For example, application state information 241 can include a score or achievement achieved by a user in an application instance. Application state information 241 can also include saved game data, or a score, level, or other state information from which a user may resume gameplay at a later point in time on the same client device 103 or another client device 103.

The data stored in the data store 212 includes, for example, applications 233, saved state data 234 relating to applications 233 that are executed by client devices 103, application marketplace data 235, and potentially other data. The applications 233 correspond to those applications 233 that have been submitted by developers and/or others, for example, for inclusion in the application marketplace. The application 233 may correspond, for example, to a game or other types of applications. As non-limiting examples, the application 233 may correspond to a first-person shooter game, an action game, an adventure game, a party game, a role-playing game, a simulation game, a strategy game, a vehicle simulation game, and/or other types of games.

The application 233 may be a game originally designed for execution in a general-purpose computing device or in a specialized video game device such as, for example, a video game console, a handheld game device, an arcade game device, etc. The applications 233 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications. Where game applications are mentioned in the following text, it is understood that game applications are merely examples of the many different types of applications 233.

The application 233, when executed by a client device 103, may expect to access one or more resources of the client device on which it is executed. Such resources may correspond to display devices, input devices, or other devices. In some cases, the application 233 may request exclusive access to one or more of the resources, whereby no other applications may have access to the particular resources. Each application 233 may include, for example, object code, binary code, source code, metadata and/or other data. The object code corresponds to code that is executable by clients 103, either natively by a processor or by way of a virtual machine executed by the processor.

The saved state data 234 that is maintained by the application marketplace system 219 includes various data relating to execution of applications 233 by client devices 103. For example, the saved state data 234 may include information about progress of a user within execution of an application by users, such as a level at which a user has progressed within a game, scoring information, achievement information relating to a game, etc. Saved state data 234 can be organized into various keys 255 and corresponding values 257. Accordingly, a key 255 can represent an event name of an event occurring in an application 233 executed by a client device 103 that an application developer may wish to synchronize across the various devices of a user. The key 255 can also take the form of an event name or event identifier that is combined with a synchronization rule. The value 257 can represent the value associated with the event, such as a score, lap time, level, page number, or any other data about application state that a developer wishes to synchronize across the various devices of a user.

The data associated with the application marketplace data 235 includes, for example, download information, categories, application usage data and/or other data. The download information indicates the popularity, either in terms of absolute number of downloads or in terms of relative popularity, of the applications 233 offered by the application marketplace data 235. The download information can also identify users, either individually by a user account and/or on an aggregate basis according to demographic category, that have downloaded a particular application 233. The categories correspond to groupings of applications 233 that may indicate similar applications 233 and may be employed by users to more easily navigate the offerings of the application marketplace data 235. Non-limiting examples of categories may include social networking applications 233, mapping applications 233, movie information applications 233, shopping applications 233, music recognition applications 233, and so on. The application marketplace data 235 can also include information about users, such as user profile data, user authentication information, usage data of users with regard to application 233 (e.g., game progress, high scores, achievements).

The client device 103 is representative of a plurality of client devices that may be coupled to the network 209. The clients 103 may be geographically diverse. The client 103 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 103 may include a display device. The display may comprise, for example, one or more devices such as cathode ray tubes (CRTs), liquid crystal display (LCD) screens, gas plasma-based flat panel displays, LCD projectors, or other types of display devices, etc. The client 103 may include one or more input devices. The input devices may comprise, for example, devices such as keyboards, mice, joysticks, accelerometers, light guns, game controllers, touch pads, touch sticks, push buttons, optical sensors, microphones, webcams, and/or any other devices that can provide user input. Additionally, various input devices may incorporate haptic technologies in order to provide feedback to the user.

The client 103 may be configured to execute various applications 233 that are distributed via the application marketplace system 219. An application 233 executed by a client device 103, as is noted above, can be configured to generate application state information 241 that is reported to the application synchronization service 221 and saved by the application synchronization service 221 as saved state data 234.

Next, a general description of the operation of the various components of the networked environment 200 is provided. To begin, an application 233 executing on a client device 103 can be instrumented upon the occurrence of an event within execution of an application instance to generate application state information 241, which contains information about the event. For example, when a certain level and/or achievement within a game application is reached, the application 233 can generate application state information 241, which can be cached within the application state cache 236, which can be stored on the client device 103. As another example, the user's progress within a game application can also be tracked and application state information 241 identifying scores, times (e.g., lap times, time to complete levels, time to reach milestones, etc.) or other state information associated with the application 233 can be generated. The application 233 can generate application state information 241 by utilizing a software library having an application programming interface (API) provided by and/or associated with the application synchronization service 221 so that the application state information 241 can be created in a standardized data format. In other embodiments, the application 233 can be instrumented to generate application state information 241 in a standardized data format.

The data format corresponding to application state information 241 can be implemented a text based data interchange format, such as JavaScript Object Notation (JSON), or any other standardized or proprietary data interchange format that can allow for the exchange of structured data. Accordingly, the application 233 executed by a client device 103 can generate and transmit application state information 241 to the application synchronization service 221, which can extract and store the application state information 241 as saved state data 234.

Application state information 241 may be transmitted by the application 233 to the application synchronization service 221 asynchronously from multiple client devices 103 as and when a particular client device 103 has the capability to transmit data via the network 209. For example, the application 233 can cache application state information 241 in the application state cache 236 on the client device 103 transmit the application state information 241 upon the occurrence of an event, such as termination of the application, network 209 accessibility, the reaching of a level and/or achievement within an application, a size of the application state cache 236 reaching a threshold size, in real time as and when events are generated within an application instance corresponding to the application 233, or upon the occurrence of other events.

The application state information 241 that is generated by an application 233 and transmitted to the application synchronization service 221 can contain a synchronization rule, an event value and/or an event name corresponding to an event occurring within an application instance executed by a client device 103. Data corresponding to an event can also include a data type, such as a number, a string, a set or list of numbers, a set or list of strings, Boolean values, or other data types. The synchronization rule can allow the application 233 to, in effect, instruct the application synchronization service 221 as to how a synchronization conflict should be resolved, should a conflict occur. The application synchronization service 221 can be configured to extract one or more of a plurality of predefined synchronization rules from the application state information 241 and apply the synchronization rule to the data contained within the application state information 251 as well as saved state data 234 to resolve potential data conflicts. Accordingly, a game developer can instrument an application 233 to generate an event and corresponding application state information 241 that the developer wishes to synchronize across multiple application instances.

The application state information 241 can include data corresponding to multiple events and/or a single event at a time. A synchronization rule can be associated with event data, or one or more event values, and specify how the application synchronization service 221 should resolve a conflict, should there be a conflict within the saved state data 234 between values 257 that are stored within the data store 212 under a given key 255. For example, a synchronization rule can specify that the highest or lowest number from a number and/or a set or list of numbers should be selected and stored as saved state data 234.

As another example, a synchronization rule can specify that a number, a string and/or one or more numbers from a list of strings or numbers associated with a particular timestamp should be selected and stored as saved state data 234 to resolve a conflict. For example, the synchronization rule can specify that the application synchronization service 221 should resolve a conflict in favor of an event value having the most recent timestamp within the saved state data 234. As another example, the synchronization rule that also specify that the application synchronization service 221 select the highest, lowest, earliest or latest N items from among many items and store the N items as saved state data 234. As yet another example, the synchronization rule that specify that a given data value associated with a particular key 255 and stored in the data store 212 as saved state data 234 should be incremented and/or decremented by an amount that can be specified within the corresponding event value in the application state information 241. Accordingly, a synchronization rule can be thought of as one of many commands that the synchronization service 221 can be configured to interpret, where these commands are embedded within application state information 241 along with the data to which these commands are applied.

Therefore, because a synchronization rule is embedded within the application state information 241 that is generated by the application 233 executed on the client device 103, the application synchronization service 221 can resolve synchronization conflicts on behalf of the application 233 without intervention from the application 233 and/or the user. For example, a synchronization rule can specify that the highest number for a given key 255 (e.g., "userscore") for a particular application 233 and user, should be selected in the event of multiple application instances reporting conflicting values for the key 255. For example, if a first application instance reports a "userscore" value of 500, but a second application instance reports a "userscore" value of 600, the application synchronization service 221 can select the higher of the two values to be stored as the corresponding value 257 for the key 255.

As another example, a synchronization rule can specify that a string having the latest timestamp should be stored under a given key 255 (e.g., "lastLevel"). Accordingly, if a first application instance reports a value of "worldone" with an earlier timestamp than a second application instance reporting a value of "worldamazing" with a later timestamp, then the application synchronization service 221 can select and store "worldamazing" to be stored as the corresponding value 257 for the key 255.

Therefore, the application state information 241 can be formatted according to a data format that can be parsed by the application synchronization service 221. In one embodiment, an identifier corresponding to a particular synchronization rule can be prepended or otherwise concatenated onto an event name or key 255 corresponding to a particular event. Additionally, an event value 257 can be paired within the synchronization rule concatenated with the event name or key 255 to form a key-value pair. Additionally, a timestamp can also be paired with the event value 257 in the event that the timestamp is required to value a potential conflict between multiple event values 257. Additional examples and discussion of a data format that can be employed for application state information 241 is described in the context of FIGS. 3-4.

Figure 3:
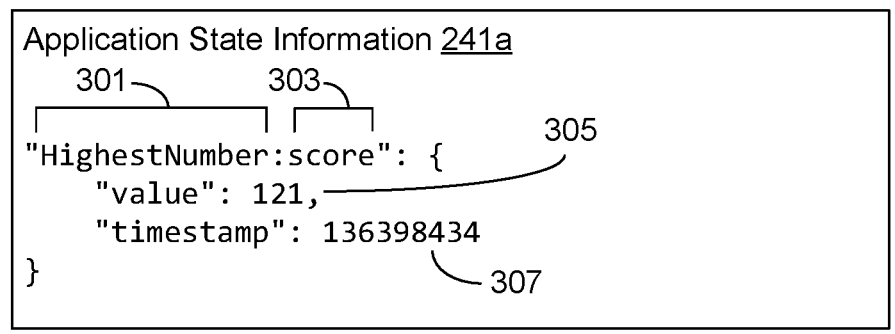
FIG. 3 is a representation of application state information generated by applications according to various embodiments of the present disclosure.
Figure 3:
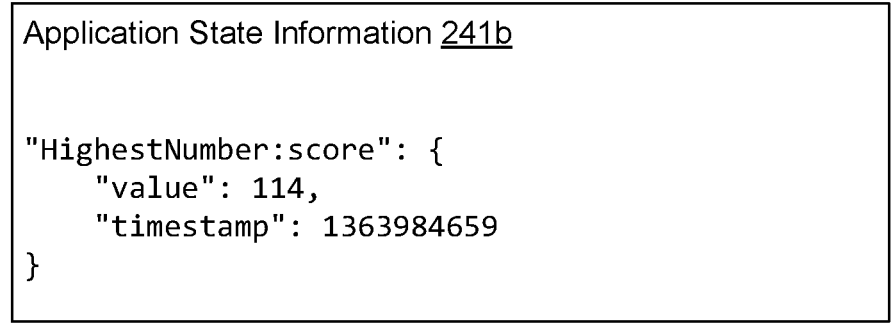

Turning now to FIG. 3, shown is an example of application state information 241a and 241b that can be generated by various instances of an application 233 according to various embodiments of the disclosure. In the application state information 241a shown in FIG. 3, a text based data interchange data structure is generated by the application 233 that contains a synchronization rule 301, an event name 303 as well as an event value 305. A timestamp 307 is also included within the application state information 241a. In the depicted example application state information 241a, a JSON data structure is employed in which the synchronization rule 301 is concatenated with the event name 303, which can correspond to the key 255 of an event stored within saved state data 234. The application state information 241a also includes an event value 305 that corresponds to a value 257 of an event stored within saved state data 234.

In the application state information 241b, which can be generated by another instance of the application 233, a differing event value may be generated because the application state information 241b corresponds to another instance. As noted above, because the synchronization rule is embedded within a data structure representing the application state information 241 that is reported by the application synchronization service 221 by the various instances of the application 233, the application synchronization service 221 can determine how to resolve a conflict between application state information 241 without additional feedback from the application 233 or elsewhere.

In the example of FIG. 3, the application synchronization service 221 can apply the synchronization rule that is embedded within the application state information 241. In the example shown in FIG. 3, the application synchronization service 221 can select the highest of the two data values in the application state information 241a and 241b for storage in the data store 212 can saved state data 234. It should be noted that the application synchronization service 221 will often resolve conflicts by comparing a synchronization rule, an event name, event value and/or timestamp within application state data 241 obtained from an instance of an application 233 executed in a client device 103 with saved state data 234 in the data store 212 that was previously saved in the data store 212 by the application synchronization service 221.

For example, the application synchronization service 221 can receive application state information 241a and locate a key 255 in the saved state data 234 that matches the event name 303 and then apply the synchronization rule 301 to the value 257 corresponding to the key 255 and the event value 305 contained within the application state information 241a.

In the depicted example, if the event value 305 is greater than the value 257 in the data store, then the value 257 can be overwritten.

Moving on to FIGS. 4A-4B, shown is an alternative example of application state information 241c and 241d. FIGS. 4A-4B illustrate an example of an event data type and event value that comprises a set or list of items (e.g., strings). In the example shown in FIGS. 4A-4B, the synchronization rule instructs the application synchronization service 221 that the values 257 stored as saved state data 234 correspond to the latest generated strings according to timestamp. In this scenario, the timestamps are generated by an application 233 when an event corresponding to an event value occurs within the application 233. In addition to a synchronization rule 301, event name 303 and multiple values 305 that can be associated with one or more timestamps 307, the application state information 241c can also include a bounding value 351 that specifies a maximum number of values that should be stored by the synchronization service 221 as saved state data 234.

In other words, the bounding value 351 can specify, along with the synchronization rule 301, how a potential conflict should be resolved where the saved state data 234 to which the synchronization rule 301 applies involves multiple values 257. In the depicted example of FIG. 4A, the synchronization rule 301 and bounding value 351 specifies that the three most recent strings should be saved as saved state data 234. Accordingly, if a subsequent application state information 241d data structure involving the same event name 303 and synchronization rule 301 is received by the application synchronization service 221 with one or more strings that are more recent, the application synchronization service 221 can drop less recent strings such that a maximum of three are saved as saved state data 234.

Accordingly, the application synchronization service 221 can store a specified number of the strings that have the latest or most recent timestamps. In the depicted example, the application synchronization service 221 can store the application state information 241c as saved state data 234 in the data store 212. Then, assuming that the application state information 241d is received after the application state information 241c is received by the application synchronization service 221, it should be appreciated that a conflict between the application state information 241c saved as saved state data 234 and the application state information 241d that should be resolved. As noted above, in many embodiments, the application synchronization service 221 compares the application state information 241 and event values contained therein with values 257 contained within the saved state data 234.

Accordingly, in the example of FIGS. 4A-4B, a conflict exists in that the strings from the lists having the most recent timestamps span both of the application state information 241c and 241d. Therefore, reference is now made to FIG. 4C, which illustrates the resolved conflict 353 generated by the application synchronization service that can be saved as saved state data 234 to the data store 212. As can be seen, the application synchronization service 221 applies the synchronization rule that was extracted from the application state information 241c and 241d and selected the most recent strings, which span both application state information 241c and 241d as the resolved conflict 353. Therefore, the data embodied within the resolved conflict 353 can be stored as saved state information 234 under a key 255 and with values 257 that corresponding to the data contained within the data structure shown in FIG. 4C.

In some embodiments, the data structure representing application state information 241 can also be structured in a hierarchical data structure in which synchronization rules 301, event names 303, and/or event values 305 can be structured in a hierarchical data structure that can correspond to a hierarchical organization (e.g., according to levels) of an application, such as a game.

Figure 5:
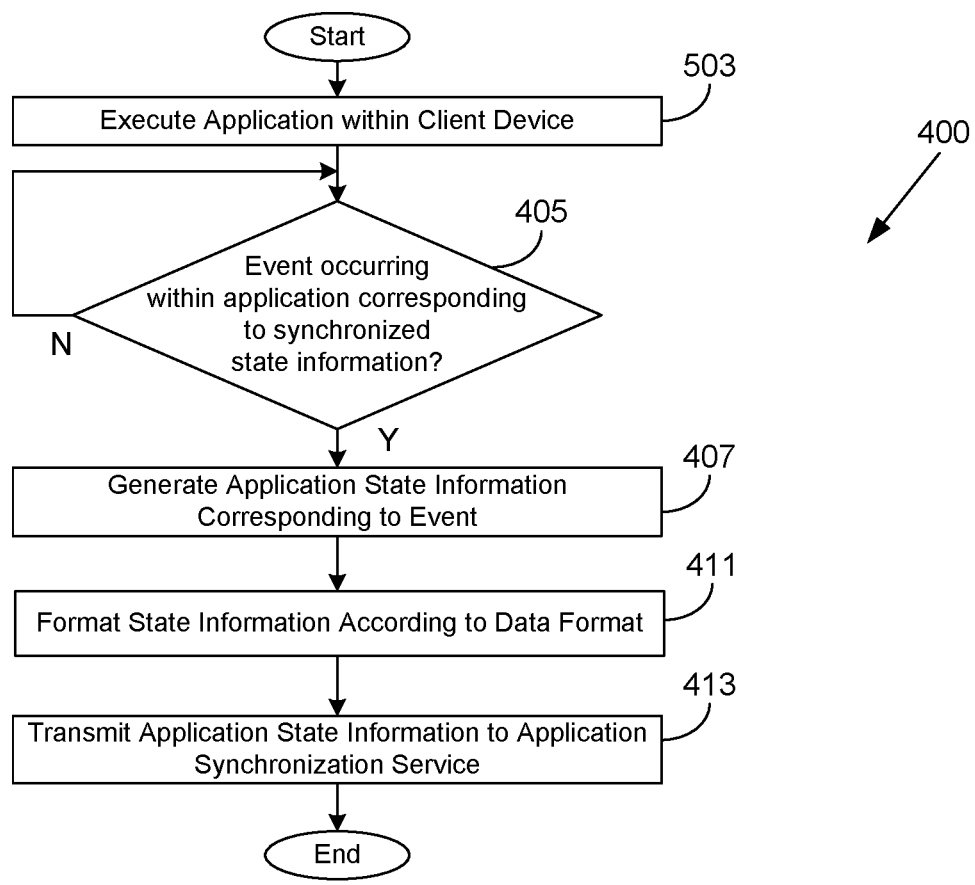
FIG. 5 is a flowchart illustrating one example of functionality implemented as portions of an application executed in a client device according to various embodiments of the present disclosure.

Referring next to FIG. 5, shown is a flowchart 400 that provides one example of execution of an application 233 executed by a client device 103 to generate application state information 241 according to various embodiments. It is understood that the flowchart of FIG. 5 provides merely an example of the many different types of functional arrangements that may be employed to implement the operation of the portion of an application 233 as described herein. As an alternative, the flowchart of FIG. 5 may be viewed as depicting an example of steps of a method implemented in the application 233 that reports application state information to the application synchronization service 221 for synchronization of state information across multiple devices of a user according to one or more embodiments.

First, in box 403, the application 233 executes functionality associated with the application 233 in a client device 103. As described above, the application 233 has been instrumented by a developer to generate application state information 241 corresponding to events that the developer wishes to synchronize across multiple devices associated with a user account. In box 405, the application 233 determines whether an event corresponding to data that is synchronized between various devices associated with a user account occurs within the client device 103. If so, then in box 407, the application 233 generates application state information 241 that contains one or more synchronization rules, event names and/or event values corresponding to the event names.

As described above, the synchronization rule corresponds to one or more commands that can be interpreted by the application synchronization service 221 for the purpose of resolving conflicts within the saved state data 234. A synchronization rule can also define a data type of the data contained within the data structure defining the application state information 241. Accordingly, the synchronization rule can comprise, for example, a command that specifies that the application synchronization service 221 save the most recent, least recent, highest and/or lowest number or string. The synchronization rule can also specify the same with regard to a set of numbers or strings as well as a bounding value associated with the set. Additionally, the synchronization rule that specify that a given value in the saved state data 234 be incremented and/or decremented by an amount contained with the application state information 241. Other variations and examples are discussed herein above.

In box 411, the application 233 formats the application state information 241 according to a data format that can be parsed by the application synchronization service 221, such as a text based data interchange format. In box 413, the application 233 transmits the application state information 241 to the application synchronization service 221.

Figure 6:
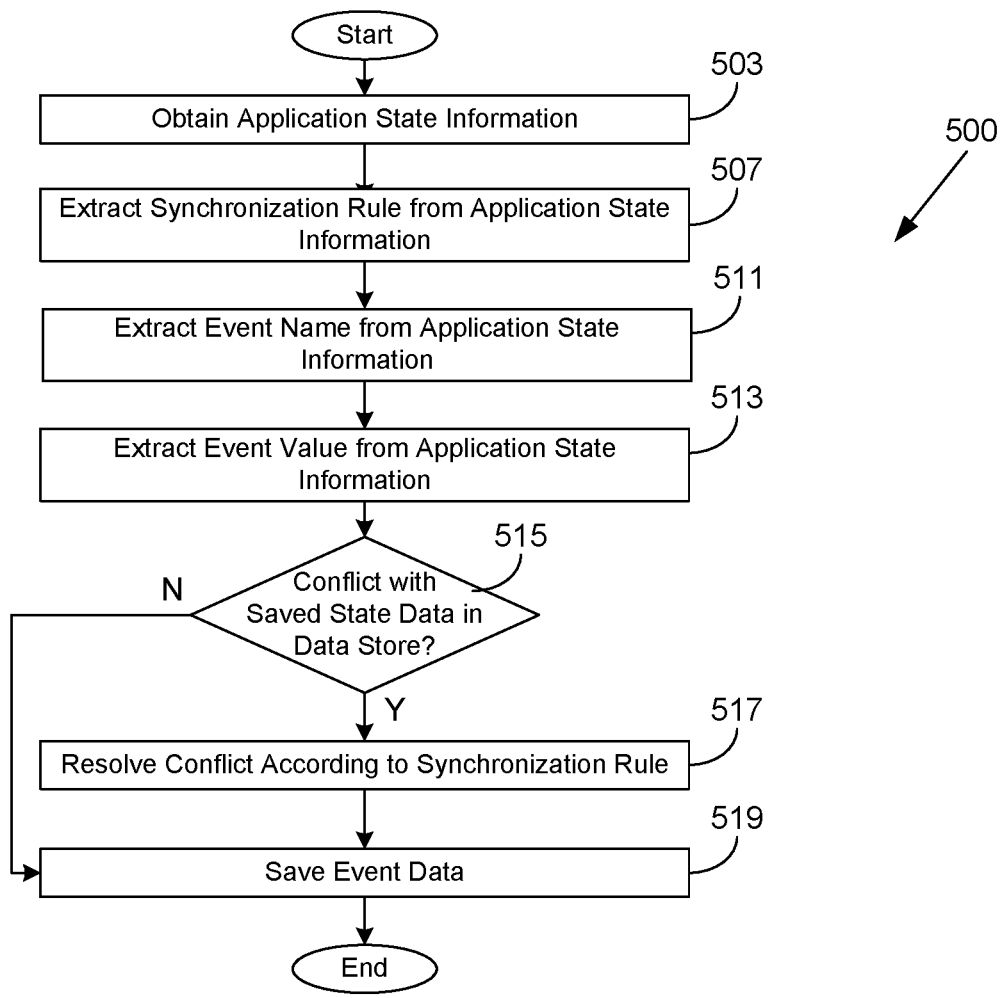
FIG. 6 is a flowchart illustrating one example of functionality implemented as portions of an application synchronization service executed in a computing environment according to various embodiments of the present disclosure.

Referring next to FIG. 6, shown is a flowchart 500 that provides one example of execution of the application synchronization service 221 executed by a computing environment 203 according to various embodiments. It is understood that the flowchart of FIG. 6 provides merely an example of the many different types of functional arrangements that may be employed to implement the operation of the portion of an application synchronization service 221 as described herein. As an alternative, the flowchart of FIG. 6 may be viewed as depicting an example of steps of a method implemented in the computing environment 203 according to one or more embodiments.

Beginning with box 503, the application synchronization service 221 obtains application state information 241 via a network 209. The application state information 241 is formatted according to a data format as described above. In box 507, the application synchronization service 221 extracts a synchronization rule from the application state information 241. In box 511, the application synchronization service 221 extracts an event name from the application state information 241. In box 513, the application synchronization service 221 extracts an event value from the application state information 241.

In box 515, the application synchronization service 221 determines whether, based upon the synchronization rule, the event value and/or event name, there exists a conflict between the application state information 241 and the saved state data 234 stored in the data store 212. If so, then in box 517, the application synchronization service 221 resolves the conflict according to the synchronization rule extracted from the application state information 241. Then, the application synchronization service 221 stores the saved state data 234 in the data store 212 upon resolution of the conflict. If no conflict was detected in box 515, the application synchronization service 221 stores the saved state data 234. Thereafter, the process ends.

Figure 7:
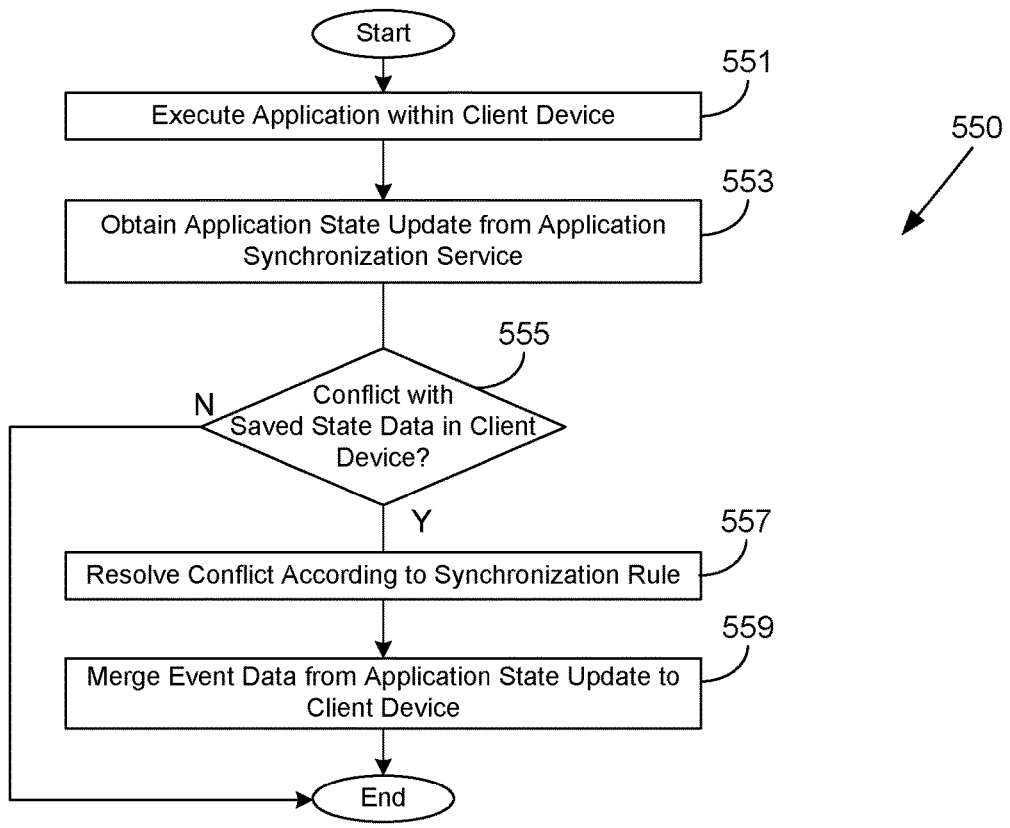
FIG. 7 is a flowchart illustrating one example of functionality implemented as portions of an application executed in a client device according to various embodiments of the present disclosure.

Referring next to FIG. 7, shown is a flowchart 550 that provides one example of execution of an application 233 executed by a client device 103 that receives an application state update 245 from the application synchronization service 221 according to various embodiments. It is understood that the flowchart of FIG. 5 provides merely an example of the many different types of functional arrangements that may be employed to implement the operation of the portion of an application 233 as described herein. As an alternative, the flowchart of FIG. 5 may be viewed as depicting an example of steps of a method implemented in the application 233 executed by a client device 103 that receives an application state update 245 from the application synchronization service 221 and merges the application state update 245 with data saved on the client device 103 according to various embodiments.

First, in box 551, the application 233 executes functionality associated with the application 233 in a client device 103. As noted above, the application 233 has been instrumented by a developer to generate application state information 241 corresponding to events that the developer wishes to synchronize across multiple devices associated with a user account. The application 233 can also be instrumented to retrieve an application state update 245 from the application synchronization service 233 and merge application state information 241 contained within the application state update 245 with state information stored on the client device 103. To merge an application state update 245, the application 233 can be configured to employ the same conflict resolution logic as the application synchronization service 221. In other words, the application 233, or a library called by the application 233, can be configured to determine whether there are conflicts between state information saved on the client device 103 (e.g., corresponding to the last time the application was executed on the client device 103) and the application state update 245 and resolve such conflicts.

Accordingly, at box 553, the application 233 obtains an application state update 245 containing application state information 241 from the application synchronization service 221. The application state update 245 can be formatted according to the data format that is utilized for application state information 241 that is generated by the application 233 and reported to the application synchronization service 221. At box 555, the application 233 can then determine whether a conflict exists between the application state update 245 and the state data saved on the client device 103 that pertains to the application 233. If a conflict exists, then at box 557 the application 233 can resolve the conflict according to the synchronization rule embedded in the application state update 245 that is associated with the event for which a conflict exists. At box 559, the application 233 can merge the application state update 245 into the state information saved on the client device 103 that pertains to the application 233 by employing the same conflict resolution logic that the application synchronization service 221 employs and saving the state information to the client device 103.

Figure 8:
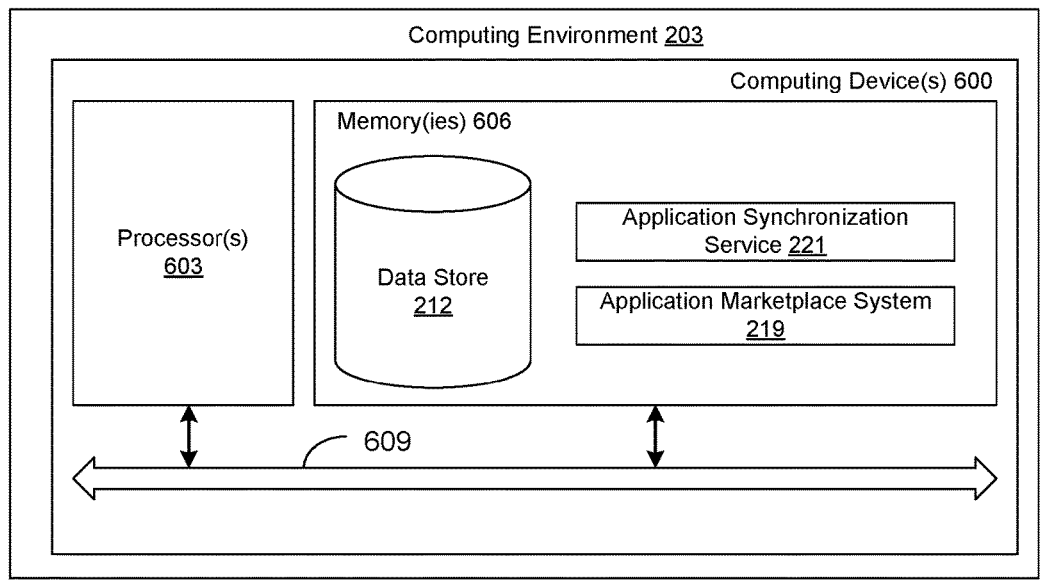
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the application marketplace system 219, application synchronization service 221, and potentially other applications. Also stored in the memory 606 may be a data store 212 and other data. In addition, an operating system may be stored in the memory 606 and executable by the processor 603.

Figure 9:
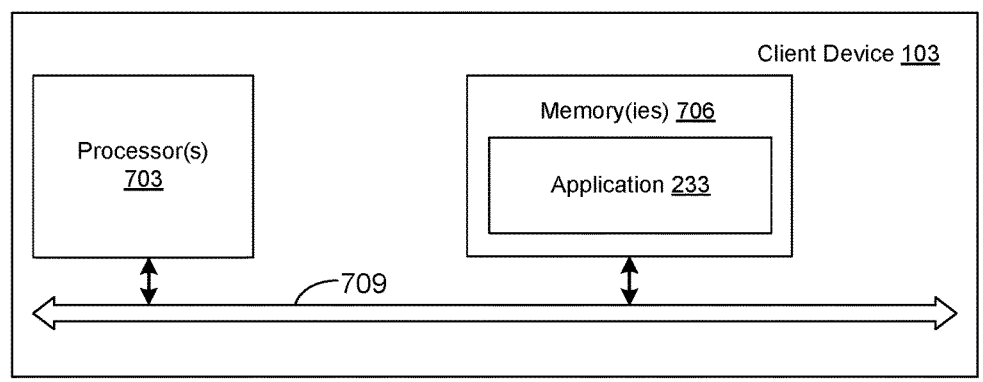
FIG. 9 is a schematic block diagram that provides one example illustration of a client device employed in the networked environment of FIG. 2 according to various embodiments of the present disclosure.

With reference to FIG. 9, shown is a schematic block diagram of the client device 103 according to an embodiment of the present disclosure. The client device 103 includes at least one processor circuit, for example, having a processor 703 and a memory 706, both of which are coupled to a local interface 709. The local interface 709 may comprise, for example, a data bus with an accompanying address/control bus or other bus structure as can be appreciated. A display may also be coupled to the local interface 709.

Stored in the memory 706 are both data and several components that are executable by the processor 703. In particular, stored in the memory 606 and executable by the processor 703 are an application 233 and potentially other applications and/or software. In addition, an operating system may be stored in the memory 706 and executable by the processor 703.

It is understood that there may be other applications that are stored in the memory 606, 706 and are executable by the processor 603, 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606, 706 and are executable by the processor 603, 703. In this respect, the term "executable" means a program file that is in a form that can ultimately be run by the processor 603, 703. Examples of executable programs may be, for example, a compiled program that can be translated into machine code in a format that can be loaded into a random access portion of the memory 606, 706 and run by the processor 603, 703, source code that may be expressed in proper format such as object code that is capable of being loaded into a random access portion of the memory 606, 706 and executed by the processor 603, 703, or source code that may be interpreted by another executable program to generate instructions in a random access portion of the memory 606, 706 to be executed by the processor 603, 703, etc. An executable program may be stored in any portion or component of the memory 606, 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606, 706 is defined herein as including both volatile and nonvolatile memory and data storage components. Volatile components are those that do not retain data values upon loss of power. Nonvolatile components are those that retain data upon a loss of power. Thus, the memory 606, 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603, 703 may represent multiple processors 603, 703 and/or multiple processor cores and the memory 606, 706 may represent multiple memories 606, 706 that operate in parallel processing circuits, respectively. In such a case, the local interface 609, 709 may be an appropriate network that facilitates communication between any two of the multiple processors 603, 703, between any processor 603, 703 and any of the memories 606, 706, or between any two of the memories 606, 706, etc. The local interface 609, 709 may comprise additional systems designed to coordinate this communication, including, for example, performing load balancing. The processor 603, 703 may be of electrical or of some other available construction.

Although the application marketplace system 219, application synchronization service 221 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIG. 5-7 show the functionality and operation of an implementation of portions of the application synchronization service 221 and/or application 233 executed by a client 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603, 703 in a computer system or other system. The machine code may be converted from the source code, etc. If embodied in hardware, each block may represent a circuit or a number of interconnected circuits to implement the specified logical function(s).

Although the flowcharts of FIG. 5-7 show a specific order of execution, it is understood that the order of execution may differ from that which is depicted. For example, the order of execution of two or more blocks may be scrambled relative to the order shown. Also, two or more blocks shown in succession in flowcharts of FIG. 5-7 may be executed concurrently or with partial concurrence. Further, in some embodiments, one or more of the blocks shown in flowcharts of FIG. 5-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the application synchronization service 221, application 233, or any other application or service, that comprises software or code can be embodied in any non-transitory computer-readable medium for use by or in connection with an instruction execution system such as, for example, a processor 603, 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Therefore, the following is claimed:

1. A computer-implemented method, comprising:
   receiving, in a client device, application state information from a computing device, the application state information associated with an event occurring within an application installed on the client device;
   extracting a synchronization rule and event data associated with the event embedded within the application state information;
   determining, based upon the synchronization rule embedded within the application state information, how to resolve a synchronization conflict between the event data embedded within the application state information and saved state data associated with the event, the saved state data being stored on the client device; and
   resolving the synchronization conflict using the synchronization rule, wherein resolving the synchronization conflict further comprises updating an entry within the saved state data corresponding to the event with the event data by applying the synchronization rule, wherein the synchronization rule comprises a command that specifies how the synchronization conflict between the saved state data and the event data from the application state information should be resolved.

2. The computer-implemented method of claim 1, wherein the synchronization conflict is resolved by applying synchronization logic specified by the synchronization rule.

3. The computer-implemented method of claim 1, wherein the event data comprises a first plurality of values, the saved state data comprises a second plurality of values, and the synchronization conflict is resolved by determining a selection of a subset of values from the first plurality of values and the second plurality of values.

4. The computer-implemented method of claim 1, wherein the synchronization conflict is resolved by making a selection between the saved state data and the event data, wherein the selection comprises one of: a highest value from among the saved state data and the event data or a lowest value from among the saved state data and the event data.

5. The computer-implemented method of claim 1, wherein the synchronization conflict is resolved by making a selection between the saved state data and the event data, wherein the selection comprises one of: a most recent value from among the saved state data and the event data or a least recent value from among the saved state data and the event data.

6. The computer-implemented method of claim 1, wherein the application state information further comprises an event name corresponding to the event.

7. The computer-implemented method of claim 6, wherein the event name and a textual identifier corresponding to the synchronization rule are concatenated into a field name within the application state information.

8. The computer-implemented method of claim 6, wherein the event name and at least one identifier corresponding to the synchronization rule are concatenated into a field name within the application state information.

9. A system, comprising:
   a client device; and
   a plurality of computer instructions executed by the client device, wherein the plurality of computer instructions cause the client device to:
     receive, in the client device, application state information from a computing device, the application state information associated with an event occurring within an application installed on the client device;
     extracting a synchronization rule and event data associated with the event embedded within the application state information;
     determine, based upon the synchronization rule embedded within the application state information, how to resolve a synchronization conflict between the event data embedded within the application state information and saved state data associated with the event, the saved state data being stored on the client device; and
     resolve the synchronization conflict using the synchronization rule by updating an entry within saved state data corresponding to the event with the event data by applying the synchronization rule, wherein the synchronization rule comprises a command that specifies how the synchronization conflict between the saved state data and the event data from the application state information should be resolved.

10. The system of claim 9, wherein the synchronization conflict is resolved by applying synchronization logic specified by the synchronization rule.

11. The system of claim 9, wherein the event data comprises a first plurality of values, the saved state data comprises a second plurality of values, and the synchronization conflict is resolved by determining a selection of a subset of values from the first plurality of values and the second plurality of values.

12. The system of claim 9, wherein the synchronization conflict is resolved by making a selection between the saved state data and the event data, wherein the selection comprises one of: a highest value from among the saved state data and the event data or a lowest value from among the saved state data and the event data.

13. The system of claim 9, wherein the synchronization conflict is resolved by making a selection between the saved state data and the event data, wherein the selection comprises one of: a most recent value from among the saved state data and the event data or a least recent value from among the saved state data and the event data.

14. The system of claim 9, wherein the application state information further comprises an event name corresponding to the event, and the event name and a textual identifier corresponding to the synchronization rule are concatenated into a field name within the application state information.

15. The system of claim 9, wherein the application state information further comprises an event name corresponding to the event, and the event name and at least one identifier corresponding to the synchronization rule are concatenated into a field name within the application state information.

16. A non-transitory computer-readable medium embodying a program executable by at client device, wherein the program, when executed, causes the client device to at least:
   receive, in the client device, application state information from a computing device, the application state information associated with an event occurring within an application installed on the client device;

extracting a synchronization rule and event data associated with the event embedded within the application state information;

determine, based upon the synchronization rule embedded within the application state information, how to resolve a synchronization conflict between the event data embedded within the application state information and saved state data associated with the event, the saved state data being stored on the client device; and resolve the synchronization conflict using the synchronization rule by updating an entry within saved state data corresponding to the event with the event data by applying the synchronization rule, wherein the synchronization rule comprises a command that specifies how the synchronization conflict between the saved state data and the event data from the application state information should be resolved.

17. The non-transitory computer-readable medium of claim 16, wherein the synchronization conflict is resolved by applying synchronization logic specified by the synchronization rule.

18. The non-transitory computer-readable medium of claim 16, wherein the event data comprises a first plurality of values, the saved state data comprises a second plurality of values, and the synchronization conflict is resolved by determining a selection of a subset of values from the first plurality of values and the second plurality of values.

19. The non-transitory computer-readable medium of claim 16, wherein the synchronization conflict is resolved by making a selection between the saved state data and the event data, wherein the selection comprises one of: a highest value from among the saved state data and the event data or a lowest value from among the saved state data and the event data.

20. The non-transitory computer-readable medium of claim 16, wherein the synchronization conflict is resolved by making a selection between the saved state data and the event data, wherein the selection comprises one of: a most recent value from among the saved state data and the event data or a least recent value from among the saved state data and the event data.

* * * * *